United States Patent [19]

Luc

[11] 4,024,038
[45] May 17, 1977

[54] ADHESIVE PROCESSES

[76] Inventor: Jane Luc, 18 Rue Fourcroy, 75 Paris 17e, France

[22] Filed: Mar. 28, 1974

[21] Appl. No.: 455,911

Related U.S. Application Data

[63] Continuation of Ser. No. 218,820, Jan. 18, 1972, abandoned, which is a continuation of Ser. No. 737,566, June 17, 1968, abandoned.

[52] U.S. Cl. ............................... 204/168; 118/638; 204/165; 250/542; 250/531
[51] Int. Cl.² ............................................ B01K 1/00
[58] Field of Search ... 117/47 A, 138.8 R, 93.1 CD, 117/48, 38; 118/638; 204/168, 165; 264/22, 23

[56] References Cited

UNITED STATES PATENTS

| | | | |
|---|---|---|---|
| 2,859,480 | 11/1958 | Berthold et al. | 117/93.1 CD |
| 2,864,755 | 12/1958 | Rothacker | 117/47 A |
| 2,910,723 | 11/1959 | Traver | 117/47 A |
| 3,081,485 | 3/1963 | Steigerwald | 117/47 A |
| 3,171,539 | 3/1965 | Holbrook et al. | 204/168 X |
| 3,182,103 | 5/1965 | Blaylock et al. | 117/38 |
| 3,369,982 | 2/1968 | Wood | 117/47 A |
| 3,376,208 | 4/1968 | Wood | 117/47 A |
| 3,438,504 | 4/1969 | Furman | 264/22 |
| 3,483,374 | 12/1969 | Erben | 117/47 A |

*Primary Examiner*—F.C. Edmundson
*Attorney, Agent, or Firm*—Kenyon & Kenyon Reilly Carr & Chapin

[57] ABSTRACT

The method of modifying materials in a uniform and reproducible manner which comprises activating and treating materials, the treating step being performed with modification agent. There is also disclosed an apparatus for modifying materials.

11 Claims, 9 Drawing Figures

ADHESIVE PROCESSES

This is a continuation, of application Ser. No. 218,820 filed Jan. 18, 1972, which in turn was a continuation of application Ser. No. 737,566 which was filed June 17, 1968, both now abandoned.

This invention relates to methods for treating materials with a view to modifying at least the surface properties thereof. The invention has particular reference to the treatment of materials such as organic plastics materials which are normally non-adherent, to render them adherent to subsequently applied materials, but is not limited to this. Broadly, the modification includes chemical activation (for example as may be achieved by irradiation treatment) including the conduction of localised unsaturation, cross-linking, the production of free radicals and grafting with other applied monomers; modification of the properties of wetability, adhesion, adsorption and absorption; film formation on a substrate from the monomer or a liquid polymer or from a solid particulate phase, including the deposition of inks or paints; chemical modification by locally induced reaction brought about by conducting the treatment in the environment of a suitable reagent; and decorative and printing processes.

It is known that the surfaces of bodies comprising normally nonadherent material can be treated to render them capable of adhering strongly to subsequently applied substances such as printing inks, paints, coatings and laminations of various types. This treatment can consist in subjecting the materials to the effect of electrical or electrostatic discharge, for example between electrodes, one of which is connected to a high frequency generating source, or in the presence of a varying high strength electric field. The treatment can also consist in the prefabrication of a flame, or in an oxidising or chlorinating treatment. However, it has been found that such treatments may render the surface much more difficult to seal or adhere to a similarly treated surface of the same material; and it is also found that the results of the method, especially in the case of irradiation treatment, are often unpredictable, and vary over the surface of the material in a non-uniform manner. Furthermore, the results can be erratic to the extent of giving good results on some days and not giving a satisfactory result on other days.

One of the objects of the invention is to provide a method of modifying the surface and/or volume properties of a material in a more uniform and reproducable manner whilst controlling the extent and efficiency of the treatment, including the precise areas in which the treatment occurs.

The material which is undergoing treatment may be in the solid state, thus for example in the form of a plate, foil, sheet film or powder; or it may be in the liquid state especially as in the case of a freshly formed film. It will be understood in any case that where a reagent is employed to participate in the modification of the material, this may be in the solid, liquid or gaseous state and may be contacted with the material before, during or after the treatments.

Whilst the invention is especially concerned with the treatment of plastics film, it is not precluded to treat metallic substances, plastics materials generally including fibres, and cellulosic products generally including paper.

The forms of energy and/or the reagents which may be utilised are constituted pre-eminently by the various forms of electrical discharge including corona discharge and electron bombardment as from an electron gun. Corona discharged treatement and electron gun treatment using guns incorporating a Van der Graff unit are already well established commercially. Other treatments include the application of high frequency electrical fields, X-rays, gamma-rays, ionising radiation generally (including laser irradiation), ultrasonic irradiation, flame treatment, frictional treatment and subjection to chemical reactions in particular chlorination and oxidation. These treatments are, of course, in general already known and used for modifying the surface properties at least of plastics materials, especially for modifying the wetability of plastics materials such as polyethylene and polypropylene. It is an object of the invention to render the treatment, for whatever purpose, more certain, more reproducable and in general efficient.

It has been discovered that di-electric materials in general and plastics materials such as tapes, films and fibres whether in the solid state or in the liquid freshly formed condition prior to solidification, carry electrostatic charges more or less randomly distributed, not merely on the surface but in the interior of the material so that the charges cannot be eliminated simply by wiping the surface off. It has also been discovered that these charges interfere to a remarkable degree with the uniform reception by the material undergoing modification, of the known modifying treatments already enumerated. It is a principal object of the invention to take steps to overcome the random influence of these electrostatic charges.

The invention consists broadly in a process of modifying at least the surface properties of the material by a treatment selected from the group of irradiation, fractional and surface chemical treatment, in which the material undergoing treatment is subjected to a homogeneous activation treatment to overcome the influence of the random electrostatic charges. In a modification, the treatment is subjected to microfocusing to an overall pattern so that the treatment is localised to this pattern thus overcoming the random influence of the electrostatic charges.

Where the material itself is preactivated, the activation treatment will generally be one selected from the same group of treatment as is available for the modification treatment itself. The activation treatment may precede, be simultaneous with or follow the modification treatment. For activation purposes, the material may be frictioned, either overall, or by means of an assembly, one surface of which is given specific topography so that friction is applied to a predetermined pattern. Alternatively, the material to be modified may be activated by irradiation using alternating electrical fields, or magnetic fields, and here again the counter electrodes may if desired have specific topography so that the activiation treatment is done to a predetermined pattern. Other methods of activation include the use of an electrically charged surface into which the material to be modified is brought into contact, and irradiation with ultra-violet light etc.

In the alternative method of the invention, the material itself undergoing modification is not activated, but the modification treatment is "microfocused" to a predetermined pattern instead of being applied more or less uniformly or randomly over a substantial area as in the case of flame, corona discharge or electron gun treatment. The method of microfocusing will depend upon the nature of the modification treatment, but in most cases it has been found that it suffices to provide the material undergoing treatment with a support or backing at the treatment area which backing has a specific topography. For example, in the case of an electrical discharge, the backing electrode may have a pattern formed in relief to any desired scale, or may have the resistivity which varies to a predetermined pattern. In the latter case it has been found convenient to form this pattern by printing for example using a layer of insulating material over the electrode this layer itself being overprinted with a conducting ink to a predetermined pattern. This pattern may conveniently take the form of a grid, or a matrix of dots. Alternatively the irradiation treatment whether using electrical discharge, alternating electrical field or electromagnetic irradiation, can be focused through a stencil. In yet another alternative, the focusing can be accomplished by means of a suitably imposed magnetic field, either to a predetermined standing pattern or arranged so that the treatment scans the surface to be treated.

It is not precluded to activate the material undergoing treatment, simultaneously with the modification treatment. For example, whilst undergoing, say, electrical discharge, irradiation, flame or chemical treatment, the material, suitably in the form of a film, can be given a friction treatment. In the case of electrical treatment, the friction can be applied by a dielectric material which can be placed in contact with the surface to be treated and the electrode connected with the high frequency generating or other electrical source providing electrical discharge means. This electrode can itself consist in a frictional source such as a roller, coming into direct contact with the surface of the material to be treated.

Mechanical means provided for activating the material can be in the form of a frictional source or a plurality of frictional sources applied to the film, web, sheet or the other form of material prior to passing into a treatment zone. Such friction means can consist in a rotating roller contacting the surface to be treated. During such friction treatment, for additional activation, the opposite surface of the material can be in contact with a backing material such as a backing roller which can be in the form of a charged electrode.

In a further method according to the invention an electrostatic charge from an alternating or direct current supply which does not produce corona discharge, can be given to the material to be treated by known means prior to treatment by electrical discharge. If such means for applying an electrostatic charge are provided with specific topography, contour, or differences in conductivity, the intensity of treatment will be strengthened in corresponding areas.

The use either singly or in combination of these means can give excellent and predictable results and will greatly improve the adhesion of subsequently applied material to the treated surfaces. One or both surfaces may be treated simultaneously depending upon the degree of intensity of the applied voltages, the materials it is required to treat, and the conditions under which the method is applied.

Figure 1:
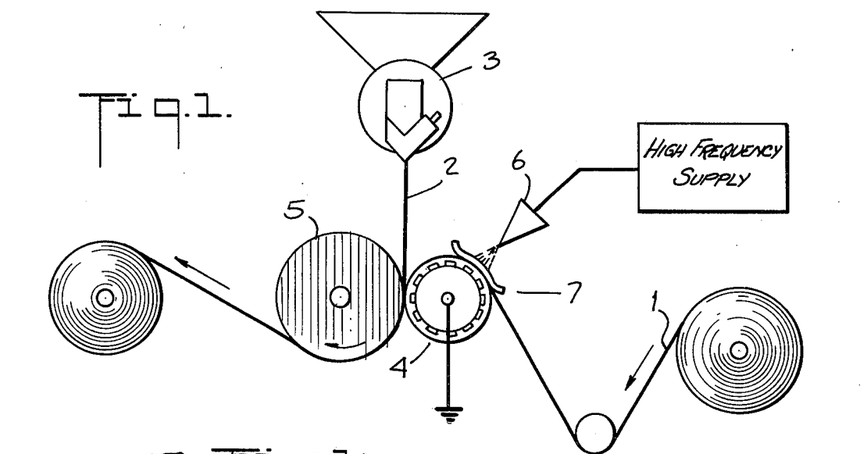

In an example, illustrated in the accompanying FIG. 1, when a paper substrate in the form of a continuous web 1 is treated prior to receiving a coating of polyethylene in the form of molten extrudate 2, from a die 3, a preferred method is to use as the nip roll 4 placed in juxtaposition with the chill roll 5 or roll used to chill the molten film, a metal roll 4 having differences in the level of its surface in the form of an overall fine mesh engraved design. This roll which serves as the second, or treating electrode, and is connected to earth, can if required be covered by a fairly thin dielectric film. The opposite electrode 6, or series of electrodes, connected to a high frequency current supply, and forming the electrical field are placed in a position against the treating electrode almost opposite to that of the chill roll, and can consist of straight electrodes or electrodes of variable contour. They are placed either in contact, or at a distance in the order of a few milimeters from a glass plate 7 formed according to the contour of that part of the backing or nip roll 4 over the area of which the treating by electrical discharge is to take place. The glass plate is itself in contact or in very close proximity to the surface of the paper web which is to be treated.

The input voltage can vary from approximately 50 to 10,000 or even 100,000 volts if required, depending upon the intensity of the treatment required, the nature of the materials undergoing treatment, and the linear speed of the web passing beneath the electrode.

This improved method of treating paper or other webs or materials will result in greater local intensity and uniformity of treatment and will not only cause stronger adhesion of the polyethylene or other coating to the paper or other web but will permit reduction of the thickness of the polyethylene or other coating normally required. This will result not only in an improved product but in a substantial economy of the finished product.

The same principles can be applied to the treatment of objects of varying shape such as polyethylene bottles, and will permit treatment in specific zones alone which earlier treatments such as flame treatments did not permit.

It is necessary that the treatment of the material in accordance with the invention, for example in the case of an extruded plastics film, should be given when the material has set to the solid state. On the contrary, it may be advantageous to activate the film immediately after extrusion whilst it is still in the more or less liquid state. This activation can be achieved by irradiation, or the application of high frequency electrical fields or by any other means which will not disrupt the liquid film.

It is an important feature of the invention, especially in relation to electrical discharge treatment of various kinds, that when one of the surfaces with which the material being treated will come substantially into contact during the treatment, has topographical differences or is discontinuous, especially in the case of a backing elecrode, the treatment will no longer be random but will be focused into the areas represented by the topographical differences or the discontinuity. A fine mesh pattern is particularly suitable. The polarity claimed in the treated material depends on the topographical differences of the surface in relief included in the treating unit. For example, if areas of high relief result in the deposition of negative charges, the areas in low relief will become associated with the deposition of a positive charge. The polarity of the charge deposited has a pronounced effect upon the wetability of the respective areas. The use of a surface having topographical differences in level can also be of great importance during the coating of a substrate by a liquid coating such as ink. If, instead, the backing electrode is replaced by a friction roller (which can operate through an intervening layer of material) or by an air knife which can operate through a stencil or mesh, not only will the intensity of the discharge be increased, but again the discharge will be focused into the areas undergoing stress or activation.

The following further Examples illustrate how the invention may be carried into effect.

EXAMPLE 1a (ILLUSTRATED IN FIG. 1)

A paper substrate in the form of a continuous web of 180 grms m2 kraft paper, travelling at a speed of 40 meters minute (120 ft) is treated prior to receiving a coating of polyethylene in the form of molten extrudate 2, from a die 3. A preferred method is to use as the nip roll 4 placed in juxtaposition with the chill roll 5 or roll used to chill the molten film, a metal roll 4 having differences in the level of its surface in the form of an overall fine mesh (150 mesh inch 2) engraved design. This roll serves as the backing electrode and is connected to earth. The opposite electrode 6, is in the form of a knife electrode and is connected to a high frequency current supply in the form of a Lepel High Frequency Spark Generator Model HFSG-2, operating at 450 K.C. (approx.) and with a maximum power input of 1.5 KW at 115 or 230 volts, single phase, 60 cycles. The setting on the unit is indicated as 3–5, 200 watts, current 0.5 amps. This electrode is positioned against the backing electrode almost opposite the chill roll, and at a distance of 2 mms from a glass plate 7 formed according to the contour of that part of the backing or nip roll 4 over the area of which the treating by electrical discharge is to take place. The glass plate is itself in contact, or in the closest possible proximity to the surface of the paper web which is to be treated.

This improved method of treating paper or other webs will result in greater local intensity and uniformity of treatment and will not only cause stronger adhesion of the polyethylene or other coating to the paper or other web, but will permit reduction of the thickness of the polyethylene or other coating normally required. This will result in a substantially improved finished product.

EXAMPLE 1b

Figures 1A, 2, 3:
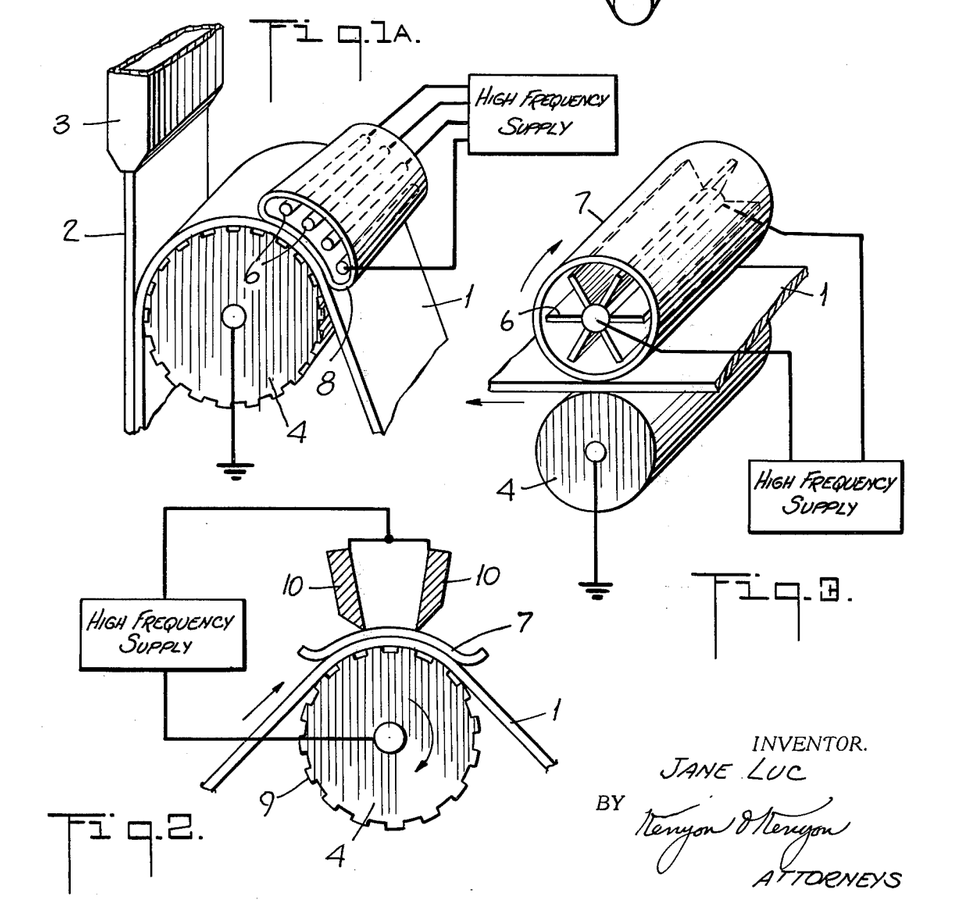

The application is as above, but the backing electrode is covered with a sleeve 8 of "Mylar" polyester material ½ inch thick (FIG. 1A). The glass plate is removed. This method can be used to treat paper webs or films of polyethylene polypropylene to improve the adhesion of inks and coatings to the materials. It can also be used to treat aluminium foil prior to its coating for example, with a polyolefin resin. The speed of travel of the film can be increased with an increase of input power to the generator.
*The charged electrode is positioned with its edge 3/16 inches from the surface to be treated.

EXAMPLE 1c

This application is as in 1a, but a web of polyethylene 2 mil thick is treated no intervening material, directly following its production by blown extrusion. Treating being carried out according to FIG. 4. The uniformity of the treatment is greatly improved, its intensity increased and the adhesion of inks also improved without damage to the heat sealing properties of the film.

EXAMPLE 1d

The application is as in 1a, combined with the apparatus of FIG. 2 but the backing electrode 4 is engraved with a printed design 9 and is rotated at the speed of travel of the film, which in this instance is 200 ft. minute. Two knife electrodes 10 spaced 1 inch apart are used to apply the electrical discharge and the Lepel unit is adjusted to a 5—5 setting giving an approximate power input of 400 watts, and a current of 0.95 amps. Immediately following this treatment the film is dusted with thermosetting inks in contrasting colours in powdered form, by contact of a brush to which the ink particles temporarily adhere before transferring to the film surface. The film is then subjected to radiation from infra red lamps stacked in series at a distance of 3 from the film surface which causes the resin particles in the ink to melt whereby it adheres permanently to the film. This will cause development of the pattern corresponding to that on the backing electrode, and will result in the production of a printed film. Liquid developers as described in the art (for example in U.K. Pat. No. 835,044, Improvements in or relating to Electro-Photography or Radiography, Commonwealth of Australia), can also be used.

As an alternative a coating of such a developer or of thermo-setting ink can be applied to the material before its passage beneath the treating unit. The pattern wil be formed in these coatings as it passes beneath the unit. The method applied can be that of Example 1, a or b. The decorative film or web can if necessary be laminated to a substrate or coated with a transparent coating following the printing step.

In all the examples, 1, a, b, c, d, the backing electrode of an engraved metal, can be replaced by a metal emboss, a carbon or graphite filled rubber or other resinous material, or by a discontinuous web, of wire or plastic mesh, or of a material having a uniform or smooth surface but comprising areas of differential conductivity or resistivity, for example, a "Mylar" polyester roll, in which metallic particules are included, or painted.

EXAMPLE 2

Treatment of a film of polypropylene to improve the adhesion of printing inks and of aqueous emulsion coatings to it.

A web of 25 μ. (micron) polypropylene film 24 inches wide is treated in the line following its production. Travelling at a speed of 100 to 200 foot minute it is given a uniform electrostatic charge by known means, for example by passage between metal electrode rollers under tension from a D.C. current supply at 500 volts, 10 amps, by passage beneath a bar electrode under tension from a similar current supply but held at a tension of 5000 volts, by corona discharge, or an ionizing source. In the present example the film is given a positive charge, it then travels beneath a knife edge electrode connected to a high frequency generator as described in Example 1a. The backing electrode carries an engraved herringbone design upon it. If both sides of the material are to be treated it can be uncovered, and if covered one side alone will be treated. Where no intervening plate or electrode covering is used a metal backing electrodie should be covered by a dielectric material. The raised portions of the backing electrode design should exceed in area the portions in recess.

The treated film can be either coated or printed, the printing inks and coatings having good adhesion to the film. The slip characteristics of the film will be superior to a film treated by conventional methods. Its sealing properties will be unimpaired and no pin-holes will result from treating on bouth sides of the film.

EXAMPLE 3

The treatment of the polyethylene coated paper to improve the adhesion of printing inks to its surface. (kraft paper 200 grs. P.E. 28 grs sq. m.)

Figures 5, 6, 8:
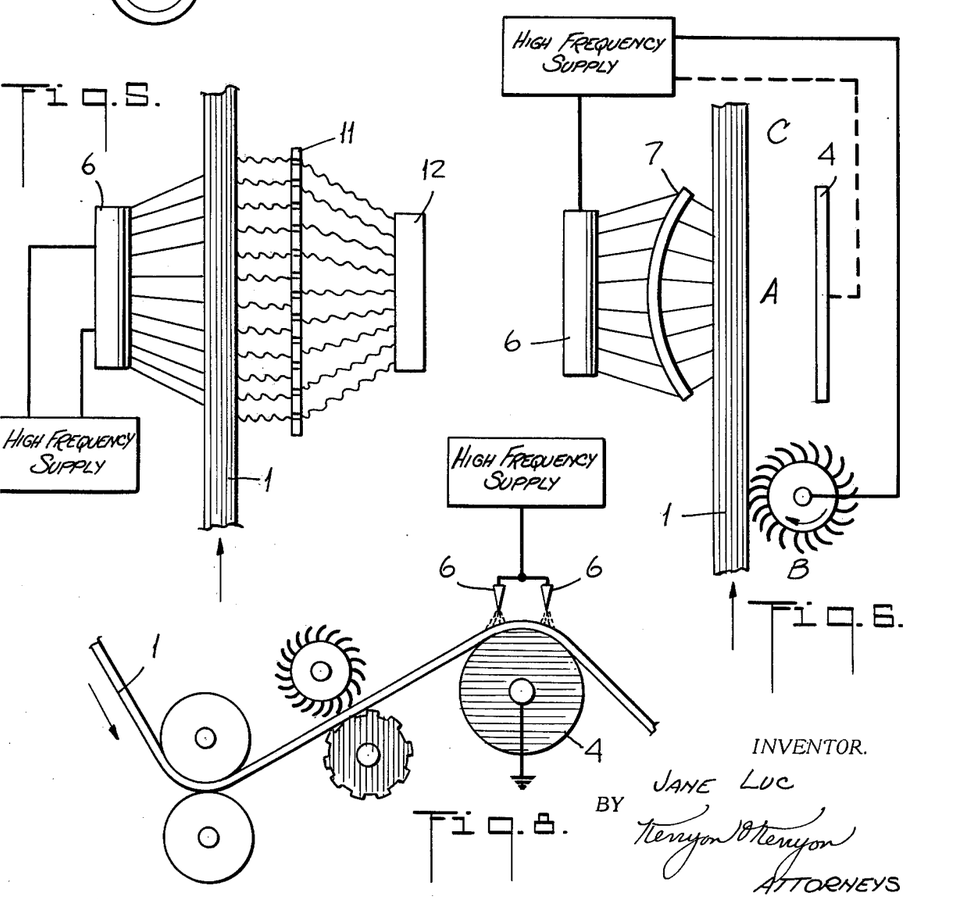

The apparatus is similar to that shown in FIG. 6 but the backing electrode is formed by a metal roll 3½ inches in diameter covered with soft nylon fur and rotating at a speed of 3000 rpm/counter to the travel movement of the web. The Lepel unit setting is 3–5 and speed of web travel 200 ft minute. The treatment creates good adhesion of printing inks to the polyethylene. Dye acceptor sites can be created in a web of synthetic fibres in this manner.

EXAMPLE 4

Figure 4:
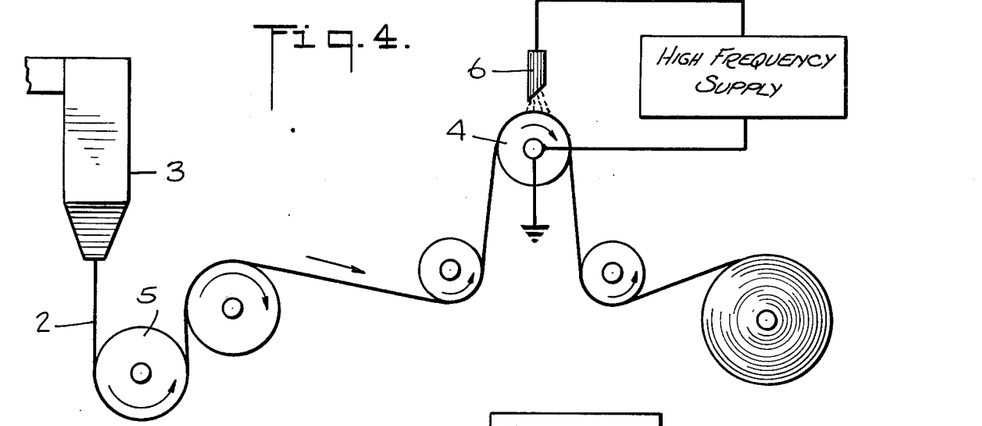

The apparatus is that shown in FIG. 4, but the backing electrode is held under tension from an electrical field giving it a either a positive or negative bias, for example by connection to the positive terminal of a D.C. current supply, 110 volts, input, 250 to 500 volts tension. The electrode is covered with "Mylar" polyester film 2/16ths inch thick and the input setting to the Lepel unit is 1–5, 100 watts, 0.25 amps. Polypropylene fibres are treated in web form, at a travel speed of 120ft minute, to improve their dye acceptability.

EXAMPLE 5

The apparatus is that shown in FIG. 5, in which the electrode connected to the high frequency current supply from Lepel generator is separated from a polyester "Mylar" film 15 (micron) by a glass sheet 2/16 thick. The Lepel setting is 3–5, and the travel speed of the film 120 ft minute. The film is held under tension between rollers as it passes beneath this electrode but is unsupported. A wire mesh plate 11 is placed at a distance of 1 inch from the back surface of the polyester film and a series of 3 ultra violet lamps 12 are placed at a distance of 2 from the wire mesh backing plate. The film is in consequence treated by electrical discharge at the same time that it is undergoing irradiation from the ultra violet lamps. This results in modification of the surface properties of the film whose adhesive properties are improved. This method also permits the deposition of a latent image on the film, for example by replacement of the wire mesh by a cut out stencil in the form of an endless belt travelling at the same rate of travel as the film. This latent image can subsequently be developed if required by liquid or solid developers.

EXAMPLE 5b

The apparatus may be that of FIG. 2, and the irradiation may be carried out immediately following the corona discharge treatment, both methods resulting in modification of the surface properties of the film.

EXAMPLE 6

High voltage electron bombardment (from a Van der Graaf generator) of polyethylene film to improve its temperature reistance, and modify its surface and volume properties.

A web 1 of polyethylene film 20 $\mu$ (micron) thick and 12 inches wide travelling at a rate of 600 ft minute per kw at one MEGARAD is treated in an electron beam passed through a glass plate 7 from an electrode 6 of a Van der Graaf generator, but prior to entering the beam it is given a uniform positive electrical charge by means described in Example 2.

During its passage under the beam the film is supported by an embossed metal sheet 4 of aluminium. The embossed pattern having a small star shaped pattern upon it. The penetration of the electron beam and the specifidity of the cross-linking will be increased in this manner.

This method is also applicable to materials or to substrates which are to be coated by glow-dicharge polymerization processes and the like. It can also be used to preactivate catalytic agents to enhance their activity, or to induce the same.

EXAMPLE 7

Figure 7:
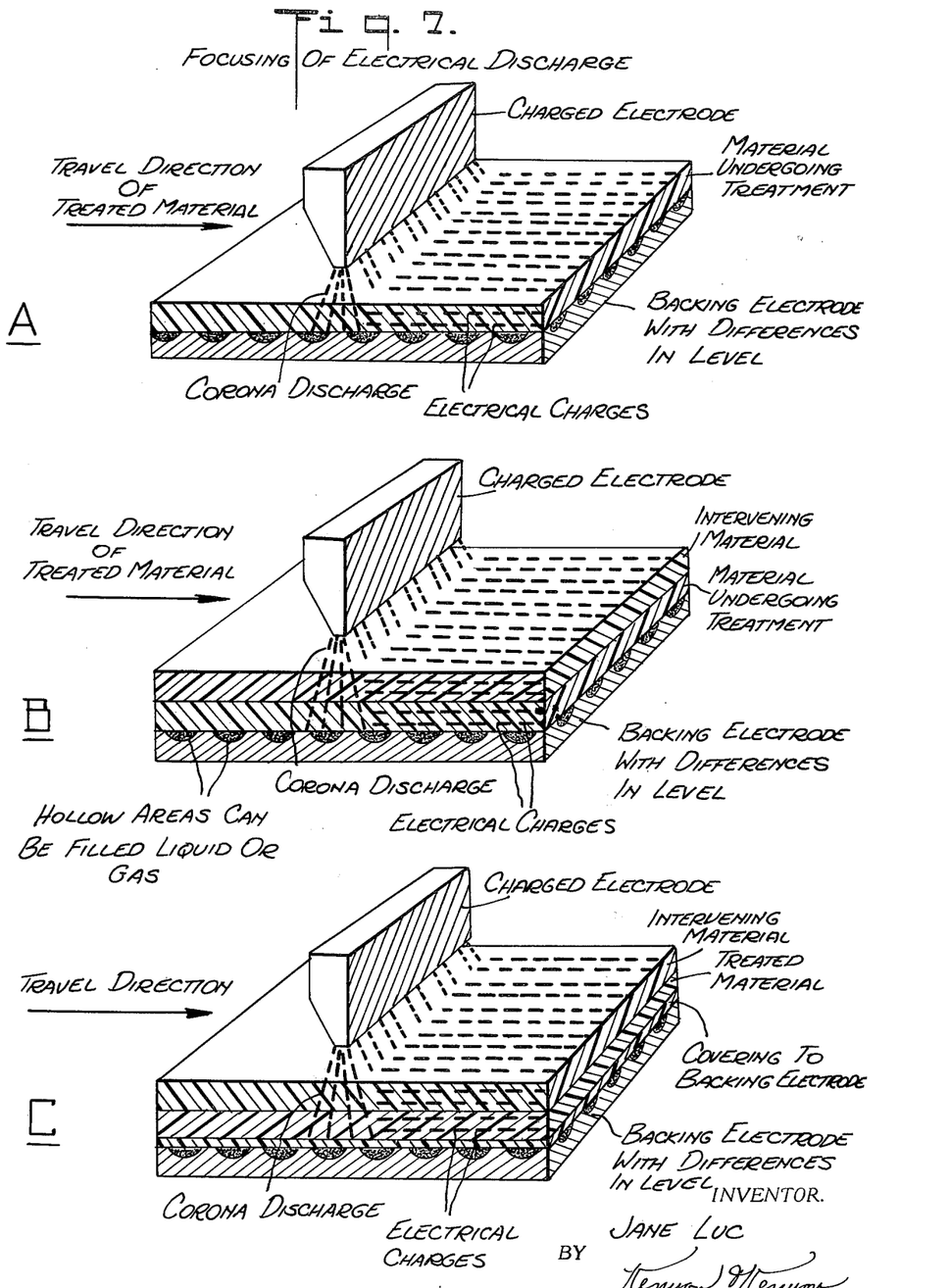

A web of paper (180 grs m2 kraft) travelling at a speed of 150 foot minute passes between two roller electrodes under tension 250 volts, from a D.C. current supply and will become electrostticaily charged. They are then subjected to electrical discharge treatment directly before coating with a low density polypropylene extrudate. The electrical discharge is supplied by a bar electrode connected to a high frequency current supply and is made of steel having an engrave criss cross patterned surface and rounded edges. The pinch roll (FIG. 7) serves as the backing electrode and is covered in smooth hard rubber (carbon filled). The distance of the electrode from the surface of the paper web is ⅛ inch.

The extrudato is also treated in that is passes an electrode of bar shape, ½ inch wide under tension from a D.C. current supply and connected to the positive terminal in the transformer. Voltage input is 5000 volts. The electrode is placed in the gap between the extruder die-lip and the nip of the pinch and chill rolls, at a distance of 1/4 inch from the liquid film of extrudate. This charges the liquid film of extrudate with an opposite charge to that on the paper web and causes greatly increased adhesion of the extrudate to the paper.

I claim:

1. The method of imparting a predetermined area pattern of modified properties to sheet material while maintaining the integrity of the surfaces of the sheet material, comprising the steps of:
    a. placing the sheet material contiguous with a pattern-defining member having an exposed surface and having an area configuration extending adjacent the exposed surface of the member and including a multiplicity of variations in predetermined properties of the member corresponding to an image of the area pattern which is to be imparted to the sheet material, the placing of the sheet material including positioning a surface of the sheet material in a juxtaposed relationship, contiguous with and facing the exposed surface of the pattern defining member and the area configuration thereof, and b. subjecting the sheet material to a high level of energy directed at a surface of the sheet material which is opposite to and faces away from the surface of the sheet material contiguous with the pattern defining member, the high level of energy being focused by the area configuration on the sheet material, and being sufficient to affect the properties of the sheet material in the area pattern corresponding to the focused image of the area configuration of the pattern-defining member while maintaining the integrity of the surface of the sheet material, the high level of energy being insufficient to cause deformation or fusion of the sheet material subjected thereto, whereby the properties of the sheet material, including properties of both the surface of the sheet material contiguous with and facing away from the pattern-defining member, are modified in an area pattern corresponding to an image of the area configuration of the pattern-defining member.

2. The method of imparting a predetermined area pattern of modified properties to sheet material in accordance with claim 1 in which the step of placing the sheet material contiguous with the exposed surface of the pattern defining member comprises placing the sheet material contiguous with the exposed surface of a pattern-defining member having an area configuration which corresponds to an image of the area pattern which is to be focused upon the sheet material and which includes a multiplicity of topographical variations in depth extending into the exposed surface and terminating therein.

3. The method of claim 1 in which the step of placing the sheet material contiguous with the pattern-defining member comprises placing the sheet material contiguous with a pattern defining member having an exposed surface in the form of a grid.

4. The method of claim 1 in which the step of placing the sheet material contiguous with the pattern-defining member comprises placing the sheet material contiguous with a pattern-defining member having an exposed surface in the form of a matrix of dots.

5. The method of claim 1 in which the step of subjecting the sheet material to a high level of energy includes subjecting the sheet material to a high level of energy energy selected from the group of forms of energy consisting of electrical discharge including corona discharge and electron bombardment, the application of high frequency electrical fields, X-rays, gamma-rays, ionizing radiation, laser irradiation, ultrasonic irradiation, flame treatment, frictional treatment, and chemical reactions, including the reactions of chlorination and oxidation.

6. The method according to claim 1 and further including the step of activating the sheet material by applying energy to the material of a form other than that employed in the step of subjecting the sheet material to a high level of energy, the step of activating being accomplished at one of the times before, during and after the step of subjecting.

7. The method of imparting a predetermined area pattern of modified properties to sheet material while maintaining the integrity of the surfaces of the sheet material comprising the steps of:

a. placing the sheet material contiguous with pattern-defining member having an exposed surface and having an area configuration extending adjacent the exposed surface of the member and including a multiplicity of variations in predetermined properties of the member corresponding to an image of the area pattern which is to be imparted to the sheet material, the placing of the sheet material including positioning a surface of the sheet material in a juxtaposed relationship, contiguous with the facing the exposed surface of the pattern-defining member and the area configuration thereof; and b. subjecting the sheet material to a high level of electrical energy directed at a surface of the sheet material which is opposite to and faces away from the surface of the sheet material contiguous with the pattern-defining member, the high level of electrical energy being focused by the area configuration on the sheet material and being sufficient to affect the properties of the sheet material in the area pattern corresponding to the image of the area configuration of the pattern-defining member while maintaining the integrity of the surface of the sheet material, the high level of electrical energy being insufficient to cause deformation or fusion of the sheet material subjected thereto, the high level of electrical energy further establishing a gradient with respect to at least the thickness of the sheet material in accordance with the variations of the pattern-defining member, whereby the properties of the sheet material, including properties of both the surface of the sheet material contiguous with and facing away from the pattern-defining member, are modified in an area pattern corresponding to an image of the area configuration of the pattern defining member.

8. The method of imparting a predetermined area pattern of modified properties to sheet material in accordance with claim 7 in which the step of placing the sheet material contiguous with the exposed surface of the pattern-defining member comprises placing the sheet material contiguous with the exposed surface of a pattern-defining member having an area configuration which corresponds to an image of the area pattern which is to be focused upon the sheet material and which includes a multiplicity of variations in the electrical properties of the pattern-defining member.

9. The method according to claim 7 in which the high level of electrical energy is directed from a source and further including the step of locating additional material comprised of a dielectric substance between the source and the sheet material.

10. The method according to claim 7 and further including the step of pre-activating the sheet material before the step of subjecting the sheet material to a high level of energy, the pre-activating including treating a surface of the sheet material with dynamic friction created by a tool in contact with the surface of the sheet material.

11. The method of applying a surface coating having an area pattern to a predetermined area of a surface of a sheet material while maintaining the integrity of the surfaces of the sheet material, comprising the steps of:

a. placing the sheet material contiguous with a pattern-defining member having an exposed surface and having an area configuration extending adjacent the exposed surface of the member and including a multiplicity of variations in predetermined properties of the member corresponding to an image of the area pattern of the surface coating which is to be applied to the sheet material, the placing of the sheet material including positioning a surface of the sheet material in a juxtaposed relationship, contiguous with and facing the exposed surface of the pattern-defining member and the real configuration thereof; and b. subjecting the sheet material to a high level of energy directed at a surface of the sheet material opposite to and facing away from the surface of the sheet material contiguous with the pattern-defining member, the high level of energy being selected from the group of energy forms consisting of electrical discharge including corona discharge and electron bombardment, high frequency electrical fields, X-rays, gamma-rays, ionizing radiation, laser irradiation, ultrasonic irradiation, flame treatment, frictional treatment and chemical reactions including the reactions of chlorination and oxidation, the high level of energy being focused by the area configuration on the sheet material in the area pattern corresponding to the focused image of the area configuration of the pattern-defining member while maintaining the integrity of the surface of the sheet material, the high level of energy being insufficient to cause deformation or fusion on the sheet material subjected thereto, whereby the properties of the sheet material, including properties of both the surface of the sheet material contiguous with and facing away from the pattern-defining member, are modified in an area pattern corresponding to an image of the area configuration of the pattern-defining member and c. coating the surface of the sheet material which is juxtaposed with, contiguous with and facing the pattern-defining member with adhesive material subsequent to the steps of placing the sheet material contiguous a pattern-defining member and subjecting the sheet material contiguous with the pattern-defining member to a high level of energy, whereby the fluid material adheres to the surface of the sheet material in an area pattern corresponding to an image of the area configuration of the pattern-defining member.

* * * * *

UNITED STATES PATENT OFFICE
CERTIFICATE OF CORRECTION

Patent No. 4,024,038          Dated May 17, 1977

Inventor(s) Jane Luc

It is certified that error appears in the above-identified patent and that said Letters Patent are hereby corrected as shown below:

Column 4, line 39, after "is" insert -- not --.

Column 6, line 10, "0.95" should read -- .95 --.

Column 6, line 16, "3" should read -- 3'' --.

Column 6, line 50, delete "the" before the word "line".

Column 7, line 8, "bouth" should read -- both --.

Column 7, line 42, insert -- a --, before "Lepel".

Column 7, line 43, "2/16" should read -- 2/16" --.

Column 7, line 51, "2" should read -- 2" --.

UNITED STATES PATENT AND TRADEMARK OFFICE
CERTIFICATE OF CORRECTION

PATENT NO. : 4,024,038
DATED : May 17, 1977
INVENTOR(S) : Jane Luc

It is certified that error appears in the above-identified patent and that said Letters Patent are hereby corrected as shown below:

Column 8, line 21, change "glow-dicharge" to --glow-discharge--.

Column 8, line 31, change "electrosttically" to --electrostatically--.

Column 8, line 43, change "extrudato" to --extrudate--.

Column 9, line 1, change "pattern defining" to --pattern-defining--.

Column 9, line 27 change "pattern defining" to --pattern-defining--.

Column 10, line 9, change "the" (first occurrence) to --and--.

Column 10, line 22, change "thesurface" to --the surface--.

UNITED STATES PATENT OFFICE
CERTIFICATE OF CORRECTION

Patent No. 4,024,038          Dated May 17, 1977

Inventor(s) Jane Luc

It is certified that error appears in the above-identified patent and that said Letters Patent are hereby corrected as shown below:

Column 11, line 8, "real" should read -- area --.

Column 12, line 14, before "adhesive" insert -- an --.

*Signed and Sealed this*

*Twenty-ninth* Day of *November 1977*

[SEAL]

Attest:

RUTH C. MASON
*Attesting Officer*

LUTRELLE F. PARKER
*Acting Commissioner of Patents and Trademarks*